United States Patent [19]

Williams

[11] E Re. 31,531

[45] Reissued Mar. 6, 1984

[54] BRAKE ASSEMBLY

[75] Inventor: William J. Williams, Franklin, Mich.

[73] Assignee: Rockwell International Corporation, Pittsburgh, Pa.

[21] Appl. No.: 276,065

[22] Filed: Jun. 22, 1981

Related U.S. Patent Documents

Reissue of:

[64] Patent No.: 4,206,834
Issued: Jun. 10, 1980
Appl. No.: 791,368
Filed: Apr. 27, 1977

U.S. Applications:

[63] Continuation-in-part of Ser. No. 687,063, May 17, 1976.

[51] Int. Cl.[3] ..... F16D 65/09
[52] U.S. Cl. ..... 188/341
[58] Field of Search ..... 188/18 R, 78, 79, 206 A, 188/250 C, 250 E, 325, 327, 329, 330, 340, 341

[56] References Cited

U.S. PATENT DOCUMENTS

| | | | |
|---|---|---|---|
| 1,761,933 | 6/1930 | Olivier | 188/78 |
| 1,832,136 | 11/1931 | Oliver . | |
| 2,038,213 | 4/1936 | Frank . | |
| 2,208,293 | 7/1940 | Hayes et al. | 188/341 |
| 2,265,999 | 12/1941 | Cadman | 188/79.5 R |
| 2,277,577 | 3/1942 | Boldt . | |
| 2,355,425 | 8/1944 | Daniels | 188/341 |
| 2,614,663 | 10/1952 | Joseph | 188/341 |
| 2,710,076 | 6/1955 | Russell | 188/78 |
| 3,339,677 | 9/1967 | Behnke | 188/78 |
| 3,398,814 | 8/1968 | Deibel | 188/78 |
| 3,650,360 | 3/1972 | King et al. | 188/330 |
| 3,894,620 | 7/1975 | Goldberg | 188/330 X |

FOREIGN PATENT DOCUMENTS

| | | | |
|---|---|---|---|
| 7247 | of 1927 | Australia . | |
| 17200 | of 1928 | Australia . | |
| 2420087 | 10/1975 | Fed. Rep. of Germany . | |
| 321433 | 9/1902 | France . | |
| 2252507 | 6/1975 | France . | |
| 46-687063 | 1/1971 | Japan | 188/341 |
| 949835 | 2/1964 | United Kingdom . | |

*Primary Examiner*—Duane A. Reger
*Attorney, Agent, or Firm*—LeBlanc, Nolan, Shur & Nies

[57] ABSTRACT

A brake assembly including a pair of brake shoes having adjacent ends pivotally mounted to a support and an actuator disposed between the ends of the brake shoes. The brake shoe webs are recessed at one end to engage a fixed anchor pin. The recess provides an arcuate bearing surface adapted to bear against a portion of the pin and permit pivoting movement of the brake shoe about the pin as the brake is actuated and released. The recess is also so oriented relative to the pin that the recess abuts the pin and prevents the brake shoe from moving away from the anchor pin. The brake assembly also includes an anchor pin having axially spaced cylindrical bearing areas adapted to radially, slidably receive the open ended recesses of a dual web brake shoe and a pair of oppositely facing surfaces extending radially outward at axially spaced locations on the pin to abut the brake shoe webs and prevent the anchor pin from being axially displaced from the support.

18 Claims, 9 Drawing Figures

FIG. 1
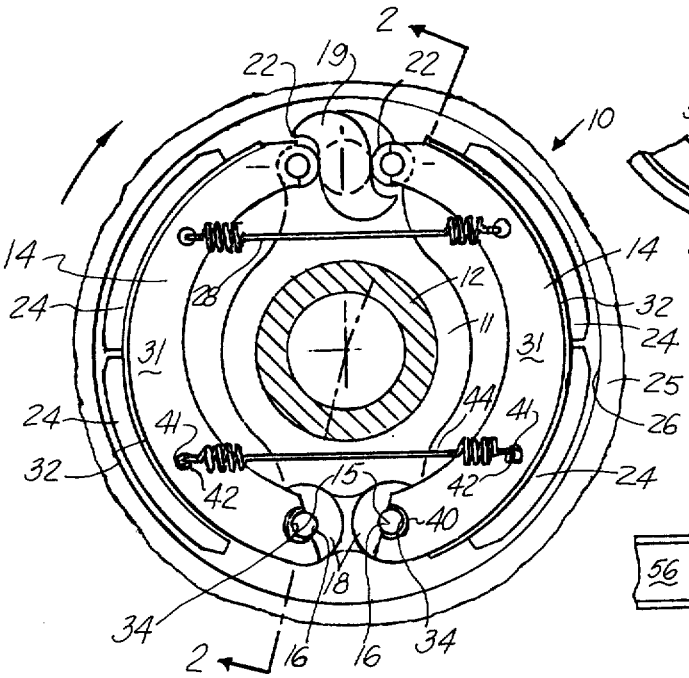
FIG. 4
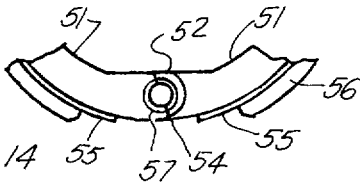
FIG. 5
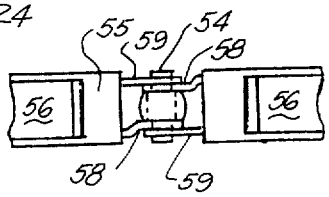
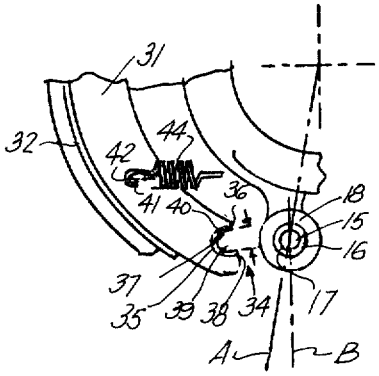
FIG. 3
FIG. 6
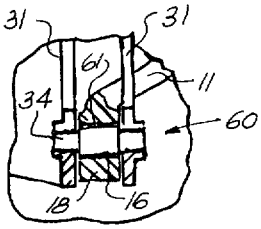

BRAKE ASSEMBLY

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of Application Ser. No. 687,063 filed on May 17, 1976 and assigned to the same assignee.

BACKGROUND OF THE INVENTION

1. Field of the Invention

The present invention is directed to certain improvements in vehicle brake mechanisms and, more specifically, to a brake shoe and an anchor pin for a vehicle brake assembly.

2. Description of the Prior Art

The invention is particularly useful in a rotary cam actuated brake assembly which includes a pair of brake shoes having adjacent ends pivotally mounted to a support and a rotatable actuating cam disposed between the other ends of the brake shoes. Rotary movement of the cam causes each of the brake shoes to pivot outwardly about its pivot or anchor pin to contact the inwardly facing friction surface of the brake drum. This type of brake assembly is used for heavy duty brake applications which may employ a dual or a single web brake shoe. The brake shoes may be cast or fabricated. The brake shoes may also carry a roller type cam follower on the ends adjacent the actuating cam. The opposite adjacent ends of the brake shoes may be mounted for pivoting movement about a single anchor pin as disclosed in U.S. Pat. No. 3,398,814 or each shoe may be pivotally mounted for movement about one of a pair of spaced anchor pins as disclosed in U.S. Pat. No. 3,114,437.

Dual web brake shoes for the brake assemblies employing a pair of spaced anchor pins are provided with axially aligned, laterally extending bores in each of the webs at the end of the shoe to be pivotally mounted to the support. The brake shoes are mounted to the assembly by aligning the web bores on opposite sides of a bore through a boss formed on the brake support or spider and inserting a pin axially through the spider bore and the coaxial brake shoe bores. The pin, generally referred to as an anchor pin, may be press fit to the boss or locked against rotation by a set screw or other means. Snap rings may be provided to the axially extending ends of the pin to prevent substantial axial displacement of the anchor pin relative to the support. The foregoing arrangement fixes the brake shoe against substantial movement relative to the support except for the desired pivoting movement about the anchor pin. In this type of brake assembly the anchor pin must be withdrawn from the spider bore when its becomes necessary to remove the brake shoes for the purpose of replacing or relining the same.

This is not necessary in brake assemblies of the type where the brake shoes are mounted for pivoting movement about a single anchor pin. In that type of assembly the adjacent ends of the brake shoe webs are each recessed to provide arcuate bearing surfaces usually less than 180° in arc, which are seated on opposite sides of the anchor pin by a radially directed movement relative to the pin. The open ended recesses provided to the brake shoe ends permit assembly to and disassembly from the anchor pin without moving the anchor pin relative to the spider. Although this arrangement provides for ease of assembly and disassembly, the brake shoes are not positively secured to the anchor pin and may become self-actuating. That is, when the brake assembly is actuated, the cam causes the brake shoes to pivot about the anchor pin to bring the friction lining pads into contact with the brake drum and thereby inhibit rotation of the brake drum and the wheel to which it is attached. The friction force between the brake drum and the linings secured to the brake shoes tends to draw the linings into further contact with the brake drum and thereby increase the magnitude of the friction force. The effect the friction force will have on the linings depends upon the direction of rotation of the brake drum.

The friction force between the drum and the lining secured to one of the brake shoes will be effective in the same general direction as the force applied by the cam actuator and will [compliment] *complement* the brake actuating force. The friction force between the drum and the lining secured to the other brake shoe will be opposite to the direction of the force applied by the rotatable cam actuator. The friction force at the circumference of that brake shoe will tend to move the brake shoe away from the anchor pin and toward the actuating cam at the other end of the shoe.

Under static conditions there is virtually no space available to accommodate any movement of the brake shoe other than the intended pivotal movement into contact with the friction surface of the brake drum. However, the brake assembly distorts under dynamic braking conditions. The system pressure and temperature generated during braking cause the brake shoes and the brake drum to expand radially in those areas where the pressure and temperature increase is the greatest. Drum type brake assemblies which are normally depicted as comprising a plurality of brake shoes with friction lined tables of generally cylindrical curvature and closely surrounded by a cylindrically curved friction surface of a brake drum under static conditions become elliptical or oblate under dynamic braking conditions. In a rotary cam actuated brake assembly the brake drums and brake shoes expand radially about the mid-point of the brake shoes and afford additional clearance for the anchor ends of the brake shoes to move away from the anchor pins if the brake shoe webs are not secured against such movement. Movement of the brake shoe away from the anchor pin causes undesirable noise and chatter as well as unnecessarily rapid wear of the lining on the brake shoe most often subject to this type of "self-actuation".

Although the components of the brake assembly could be made more massive to produce an assembly which is less susceptible to distortion under dynamic braking conditions, such as assembly would be economically unfeasible because of the additional metal required in the manufacturing process and the mass added to the weight of the vehicle. The economics of manufacture and vehicle operation thus dictate that the state of the art rotary cam actuated brake assembly is both satisfactory and reliable and should be improved wherever possible to enhance its operation and servicability.

SUMMARY OF THE INVENTION

The present invention provides a brake shoe including at least one web recessed at one end, the recess being of a width to radially slidably engage a cylindrical bearing surface of an anchor pin mounted to a support as a vehicle axle housing. The recess is also oriented to pivot about the cylindrical bearing surface of the anchor pin in response to an outwardly directed force applied at the other end of the brake shoe and to abut the cylindrical bearing surface of the anchor pin and prevent movement of the brake shoe in response to a force tending to move the brake shoe away from the anchor pin. The recess may comprise an arcuate bearing surface and a portion of the brake shoe web extending tangentially from one end of the arcuate bearing surface. In a preferred embodiment the recessed end of the brake shoe web includes a slot comprised of an inner arcuate bearing surface and a mouth portion formed by integral portions of the brake shoe web at the opposite ends of the arcuate bearing surface.

The invention also provides an anchor pin for a rotary cam actuated brake assembly which has axially spaced cylindrical bearing areas adapted to radially, slidably receive open ended recesses provided at one end of a dual web brake shoe and a pair of oppositely facing surfaces extending radially outward at axially spaced locations on the pin to abut the brake shoe webs and prevent the anchor pin from being axially displaced from the support. In the preferred embodiments, the anchor pin is provided as an elongate pin having a stepped cylindrical surface including a cylindrical surface of one diameter at each end of the pin and a cylindrical surface of greater or smaller diameter extending a substantial axial distance between the cylindrical surface of each end of the pin.

The invention and the advantages offered thereby will become apparent from the following detailed description of the embodiments shown by the accompanying drawings.

BRIEF DESCRIPTION OF THE DRAWINGS

In the drawings wherein like reference numerals refer to like parts:

FIG. 1 is a side elevation, partly in section, of a brake assembly according to the present invention;

FIG. 3 is a fragmentary view showing part of the brake shoe and brake spider of the brake assembly shown by FIG. 1;

FIG. 4 is a fragmentary view showing an alternate embodiment of the invention;

FIG. 5 is a bottom view of the embodiment of FIG. 4;

FIG. 6 is a fragmentary view, partly in section, showing an alternate means for pivotally mounting the brake shoes of FIG. 1;

DESCRIPTION OF THE INVENTION

Figure 2:
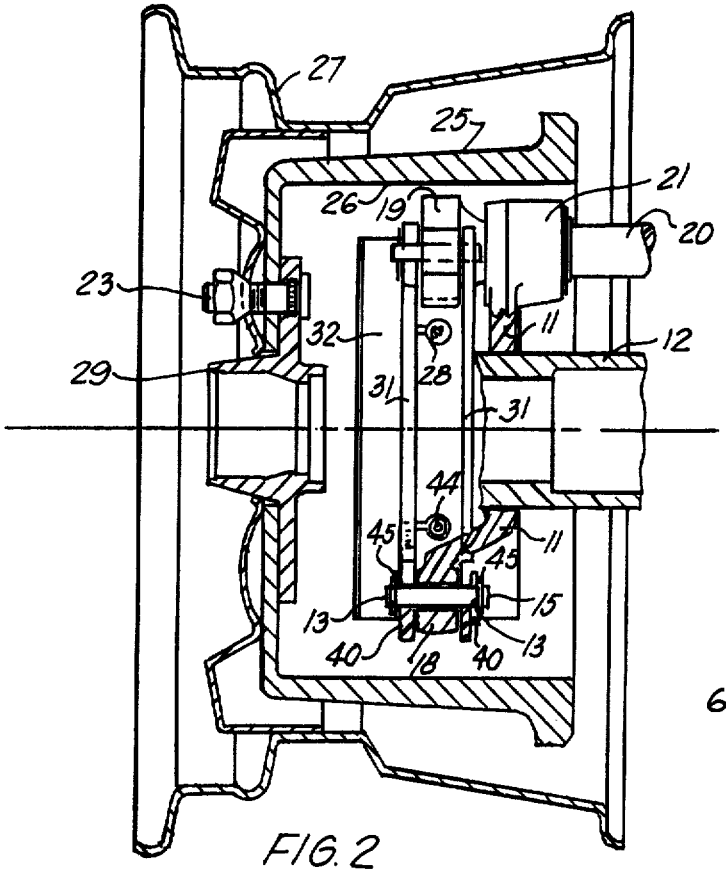
FIG. 2 is a view, partly in section, taken along line 2—2 of FIG. 1.

With reference to the drawings, there is shown a cam actuated brake assembly generally designated by the numeral 10. The brake assembly 10 is supported by a spider 11 rigid with a vehicle axle housing 12. The brake assembly 10 includes a pair of brake shoes 14 each of which is pivotally mounted at one end to an anchor pin 15 carried by the spider 11. The anchor pins 15 are each carried in a cylindrical bore 16 provided through bosses 18. As best shown by FIG. 2, the bosses 18 are formed as depending integral parts of the spider 11 and are axially offset from the upper portion of the spider 11. The offset permits the bosses 18 to be located between the dual webs of the brake shoes 14.

A cam 19 is mounted for rotary movement between the adjacent ends of the brake shoes 14 opposite from the anchor pins 15. The brake shoes 14 are each provided with a roller type cam follower 22. The cam is non-rotatably secured to a cam shaft 20 mounted to the spider for rotary movement in a bearing 21. The cam shaft is rotated by means not shown to rock the cam 19 in a clockwise direction through an arc in the range of 10° to 30°. The cam 19 provides an outwardly directed force to the rollers 22 and the brake shoes 14 which causes the brake shoes to pivot about the anchor pins 15. This movement forces the friction lining pads 24 into contact with the inwardly facing friction surface 26 of a brake drum 25 secured by conventional means 23 to a wheel 27 rotatably mounted by hub 29 to a spindle at the outer end of axle housing 12. When the brakes are released the brake shoes 14 and the friction lining pads 24 are withdrawn from contact with the brake drum surface 26 by a return spring 28 secured at its opposite ends to the brake shoe webs.

The brake shoes 14 are dual web fabricated brake shoes. That is, each brake shoe includes a pair of axially spaced webs 31 secured to a table 32. The webs 31 are flat in a radial direction and curved in a longitudinal or circumferential direction. The brake shoe table 32 is curved in the circumferential direction and the webs 31 are welded in parallel relation along the interior curved portion of the table. This provides a generally rigid assembly of component parts to which the friction lining pads 24 may be secured by rivets or by chemical bonding.

Each of the brake shoe webs 31 is provided with an open recess 34 at the end opposite the cam follower 22. The recess 34 is in the form of a slot which includes an inner arcuate bearing surface 35 and a mouth formed by integral brake shoe portions 36, 38 *having flat surfaces 36a and 38a, respectively,* which extend tangentially outward from the opposite ends of the arcuate bearing surface 35. The bearing surface 35 is a semi-circular bearing surface adapted to engage a complementary arcuate surface 17 of the generally cylindrical end portion 13 of anchor pin 15. The bearing surface 35 is comprised of an upper portion 37 and a lower portion 39. The recess 34 is canted so the upper and lower portions 37 and 39 of the bearing surface 35 are disposed to engage the complementary arcuate surface 17 at the bottom of pin 15 on both sides of a radial plane passing through the center of anchor pin 15 and the axis of rotation of the wheel 27 carried by axle housing 12. The plane is represented by the line A in FIG. 3 which passes through the center of anchor pin 15 and the longitudinal center of axle housing 12 which is coaxial with the axis of rotation of brake drum 25 and the wheel 27 to which the brake drum is secured.

With reference to FIGS. 1 and 3, the outer end of the lower portion 39 of arcuate bearing surface 35 and the web portion 38 of the brake shoe [31] *14* shown to the left in the drawings are disposed to bear against a portion of the complementary arcuate surface 17 to the right of the plane represented by the line A. When the brake assembly 10 is actuated with the wheel and brake drum 25 rotating in a clockwise direction as indicated by the arrow in FIG. 1, the friction developed between the pads 24 and surface 26 of brake drum 25 will develop a circumferentially directed force tending to move both of the brake shoes [31] *14* in a clockwise direction. The circumferentially directed force between the brake drum 25 and the friction linings 24 secured to the *leading* brake shoe [31] *14* shown to the right in FIG. 1 will tend to move that brake shoe in the direction of its anchor pin 15 and thus [compliment] *complement* the braking actuating force applied by cam 19. The circumferentially directed force developed between the brake drum 25 and the friction linings 24 secured to the *trailing* brake shoe [31] *14* shown to the left in FIG. 1 will be opposite to the force applied by the cam 19 and, if that brake shoe were not restrained, the circumferentially directed force would move the brake shoe away from the anchor pin 15 in a clockwise direction toward the other end, that is, the cam follower end of the brake shoe. The canted recess 34 of the brake shoe [31] *14* prevents such movement. A portion of the complementary arcuate surface 17 of pin 15 bears against the lower end surface 35 to the right of the plane represented by line A and prevents the brake shoe from moving away or becoming disassociated with the anchor pin.

The width D of the mouth portion of recess 34 and the diameter of the inner arcuate bearing surface 35 are selected so as to permit the brake shoes to be slidably engaged with the ends of the anchor pin 15 projecting from opposite sides of the spider boss 18. This arrangement provides for ease of assembly and disassembly while the lower portion 39 of the recess and the web portion 38 are hooked around a portion of the anchor pin 15 remote from the primary bearing portion. The lower end portion 39 of the recess and the web portion 38 are thus oriented to abut that remote portion of the anchor pin 15 and prevent the brake shoe moving away from the anchor pin as the brake shoes become self-actuating. Due to the clearance provided for ease of assembly, the brake shoe web will move a limited distance until the hooked end of the web abuts the anchor pin, but once the recess abuts the pin it will prevent further movement of the brake shoe in response to a force tending to move the brake shoe away from the anchor pin.

Although for ease of manufacture and assembly it is preferred to utilize a semi-circular inner arcuate bearing surface 35, the bearing surface of recess 34 may be less than 180° of arc from end to end. The recess 34 or slotted ends of the brake shoes [31] *14* are preferably canted at an angle between about 5° and 30° relative to the plane represented by the line B in FIG. 3. The line B represents a plane passing through the center of anchor pin 15 and parallel to the vertical axis of the brake assembly which passes through the center of the rotary cam as shown in FIGS. 1-3. With an inner arcuate bearing surface of 180° this disposes 5° to 30° of the arcuate bearing surface 35 at the lower end portion 39 on the right or remote side of the plane represented by the line B as shown in FIG. 3 *and thus disposes the tangential surfaces 36a and 38a at an angle of from 60° to 85° with respect to the same plane.*

The amount of extension beyond the plane passing through the center of the anchor pin and the axis of rotation of the wheel required to retain the recessed end of the brake shoe web on the anchor pin is dependent on the size of the brake and the location of the anchor pins relative to the axis of rotation and the diameter of the friction surface of the brake drum. The orientation of the recess as described above has proven satisfactory on a 16½ inch nominal diameter brake assembly having a pair of anchor pins spaced 2½ inches apart on a line 6¾ inches below the horizontal center line and having a 1 inch diameter recess bearing surface. Although the orientation may differ for other brake assemblies, adequate retention can be obtained so long as the lower end 39, 38 of the recess extends beyond the plane represented by the line B in FIG. 3. In the embodiment shown by FIGS. 1-3 the lower end portion 39 of the recess 34 extends about 20° beyond the right side of the plane represented by the line B while the *surfaces 38a of* web portion [39] *38* which extends tangentially from the lower end portion 39 of recess 34 extends a substantial distance, about ¼ inch, beyond the lower end portion 39.

Although the recesses 34 may be of the same thickness as the brake shoe webs 31, it is preferred to provide a greater surface area for bearing against the anchor pin 15. The area of the arcuate bearing surface 35 may be increased by providing a shoulder 40 around the recess 34. This may be accommodated by welding a U-shaped element to the surface of the web 31.

During assembly the anchor pins 15 are fitted to the bores 16 of the spider bosses 18. The brake shoes [31] *14* are mounted to the spider by sliding the recesses 34 in a generally radially direction over the cylindrical ends 13 of the anchor pins 15 extending from the opposite sides of the spider bosses 18. The webs 31 of each brake shoe may be through punched with laterally aligned holes 41. A pin 42 is inserted through the laterally aligned holes 41 of each brake shoe 14 and the opposite ends of a retention spring 44 are hooked around each respective pin 42. The retention spring 44 helps spring 28 urge the arcuate bearing surfaces 35 provided at the recessed ends of the brake shoes 14 into contact with the anchor pins 15.

A pair of snap rings 45 are seated in grooves 46 provided adjacent the opposite ends of the anchor pins 15 to prevent axial movement of the brake shoe webs 31 relative to each anchor pin 15.

The remaining components of the brake assembly 10 as shown by FIG. 1 and the brake drum 25 are added in conventional manner.

FIGS. 4 and 5 show an alternate embodiment of the present invention where a pair of brake shoes 51 having open ended recesses 52 are pivotally mounted to a single anchor pin 54. In this embodiment the brake shoe tables 55 are provided with friction lining material 56 and the recessed end of one of the webs 58 of each brake shoe is axially offset to seat on the pin 54 internally adjacent the recessed end of the web 59 of the other brake shoe. A similar arrangement using axially offset recessed ends may also be utilized to pivotally mount single web brake shoes on a single anchor pin.

The brake shoes of the invention thus, through the anchor pin recesses and their particular orientation relative to the anchor pins supported by the spider, provide for ease of assembly and disassembly while avoiding the self-actuating feature associated with prior art brake assemblies utilizing brake shoes having open ended anchor pin recesses.

FIG. 6 shows an alternate arrangement for mounting a dual web brake shoe with each web having an open ended recess to a support boss of the type disclosed in FIGS. 1–3. In FIG. 6 an anchor pin 60 is inserted in a bushing 61 seated in the cylindrical bore 16 of spider boss 18.

Figure 7:
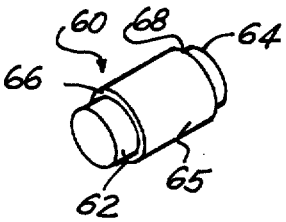
FIG. 7 is a perspective view showing the anchor pin of FIG. 6.

The anchor pin 60, as best shown by FIG. 7, is an elongate member having a stepped cylindrical surface comprised of a cylindrical bearing surface 62 and 64 at each end and a cylindrical mounting surface 65 extending a substantial axial distance between the bearing surfaces 62 and 64. The surfaces 62, 64 are of the same diameter and are smaller than the mounting surface 65. The surfaces 62, 64 are also separated from the mounting surface by a pair of oppositely facing radially extending surfaces 66 and 68.

The diameter and length of the mounting surface 65 provide a snug fit in the bushing 61 with the oppositely facing radial surfaces 65 and 68 flush with the external surfaces of the spider boss 18. The recessed ends 34 of a dual web brake shoe are radially slidably engaged or seated on the cylindrical bearing surfaces 62 and 64. As the return spring 28 and/or the retention spring is applied to the brake shoes, the cam follower ends of the brake shoes are biased toward the rotary cam and the open ended recesses are firmly seated on the bearing surfaces 62 and 64. The width D of the recesses 34 is not as large as the diameter of the mounting surface 65. The portion of the brake shoe webs surrounding the recesses 34 thus serve as abutments which are contacted by the radially extending surfaces 66, 68 of the anchor pin and prevent substantial axial movement of the anchor pin 60 relative to the brake shoe webs 31 and thereby prevent the anchor pin 60 from being axially displaced from the bore 16.

Figure 8:
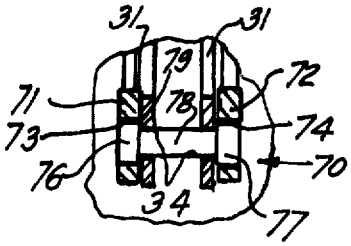
FIG. 8 is a view similar to FIG. 6 but showing a means of pivotally mounting the brake shoes of FIG. 1 to a different type of support.

FIG. 8 shows a further arrangement for mounting a dual web brake shoe with each web having an open ended recess to a brake assembly support. In FIG. 8 the brake support or spider is formed to provide a pair of axially spaced depending bosses 71 and 72 with a cylindrical bore 73,74 or a pair of axially aligned cylindrical bores 73, 74 extending through said bosses.

Figure 9:
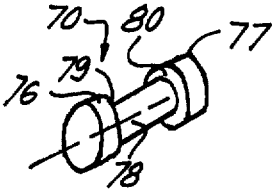
FIG. 9 is a perspective view showing the anchor pin of FIG. 8.

The anchor pin 70, as best shown by FIG. 9, is an elongate member having a stepped cylindrical surface comprised of a cylindrical mounting surface 76 and 77 at each end and a cylindrical bearing surface 78 extending a substantial axial distance between the mounting surfaces 76 and 77. The mounting surfaces 76, 77 are of the same diameter and are larger than the bearing surface 78. The bearing surface 78 is separated from the mounting surfaces 76, 77 by a pair of oppositely facing radially extending surfaces 79 and 80.

The diameter and length of the mounting surfaces 76 and 77 provide a snug fit in the bores 73, 74 of the axially spaced bosses 71, 72 with the radial surfaces 79 and 80 flush with the internal surfaces of the bosses 71, 72. The recessed ends 34 of a dual web brake shoe are radially, slidably engaged or seated on axially spaced bearing areas of the bearing surface 78. The return and/or retaining springs are applied to bias the brake shoes toward the rotary cam and firmly seat the recesses 34 on the anchor pin 70. As in the embodiment of FIG. 8, the width D of the recesses 34 is not as large as the diameter of the cylindrical mounting surfaces 76, 77 and the webs surrounding the recesses 34 serve as abutments contacted by the radially extending surfaces 79, 80 of the anchor pin. The brake shoe webs 31 and anchor pin surfaces 79, 80 thus interact to prevent substantial axial movement of the anchor pin 70 relative to the brake shoe webs and thereby prevent the anchor pin 70 from being axially displaced from the spaced bores 73, 74.

The anchor pins 60 and 70 both comprise an elongate pin having stepped cylindrical bearing areas for receiving the open ended recesses of a dual web brake shoe and a pair of oppositely facing surfaces extending radially outward at axially spaced locations to prevent the anchor pin from substantial movement relative to the brake shoe webs and, more importantly, to prevent the anchor pin from being axially displaced from the brake support bore. As such, the anchor pins do not require other means such as snap rings or pressure plates to secure the pins against accidental displacement from the brake support bore.

When used with the open ended dual web brakes shoes described in conjunction with FIGS. 1–3, the smaller diameter bearing surfaces of the anchor pins 60 and 70 provide a stronger web portion to hook around the anchor pin. This is beneficial due to the high stresses encountered as the anchor pin holds the hooked end of the brake shoe web against displacement under dynamic braking conditions. Increased web end strength is provided by the smaller diameter cylindrical bearing surfaces while the larger diameter cylindrical mounting surfaces of the anchor pins 60 and 70 permit the improved, open ended, dual web brake shoes to be used with brake support plates having large diameter anchor pin bores. The anchor pins 60 and 70 may thus be used with the improved open ended, dual web brake shoes as replacement parts for brake assemblies already in service and as components for new brake assemblies without changing the tooling for manufacturing the brake support plates.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

I claim:

1. A brake shoe *for a brake assembly of the type including a brake drum and a pair of brake shoes having adjacent ends pivotally mounted to a support and actuating means disposed between the other ends of the brake shoes to pivot said brake shoes into frictional contact with said brake drum thereby developing a circumferential force which complements the force actuating one shoe and a circumferential force opposite to the force actuating the other shoe, said shoe* including at least one continuous rigid web having an open ended recess at one end, said recess being of a width to radially, slidably engage a cylindrical bearing surface of an anchor pin mounted to a support on a vehicle axle [housing] and being [oriented] *adapted* to pivot about said cylindrical bearing surface of said pin in response to an outwardly directed *brake actuating* force applied at the other end of said brake shoe [and], *said recess having an inner arcuate surface in bearing abutment with said bearing surface of said pin and being oriented to extend on both sides of a plane passing through the axis of curvature of said bearing*

*surface and parallel to a major axis of said brake assembly which passes through the center of said actuating means, said arcuate surface intersecting said plane on the side of the axis of curvature of said bearing surface remote from said actuating means and said portion of said arcuate surface which lies on the side of said plane opposite to the major part of the web extending between 5° and 30° therebeyond* to [abut] *maintain said arcuate surface in abutment with* said [cylindrical] bearing surface and prevent *substantial* movement *other than pivotal movement* of said brake shoe *relative to said anchor pin* in response to a *drum derived* force tending to move said brake shoe away from said anchor pin.

[2. The brake shoe defined by claim 1 wherein said recess is comprised of an inner arcuate bearing surface and a portion of said web extending tangentially from said arcuate bearing surface at one end thereof.]

3. The brake shoe defined by claim [2] *1*, wherein said arcuate bearing surface extends through an arc no greater than 180° from end to end.

[4. The brake shoe defined by claim 2 wherein said one end of said arcuate bearing surface is disposed to abut said cylindrical surface of said anchor pin in response to a force tending to move said brake shoe away from said anchor pin.]

[5. The brake shoe defined by claim 2 wherein said portion of said web extending tangentially from said arcuate bearing surface is disposed to abut said cylindrical bearing surface of said anchor pin in response to a force tending to move said brake shoe away from said anchor pin.]

[6. The brake shoe defined by claim 2 wherein said one end of said arcuate bearing surface and said tangentially extending portion of said brake shoe web comprise a portion of said brake shoe web formed to be hooked around and abut said anchor pin in response to a force tending to move said brake shoe away from said anchor pin.]

[7. The brake shoe defined by claim 1 wherein said recess is in the form of a slot comprised of an inner arcuate bearing surface having oppositely disposed ends and a mouth portion formed by integral web portions at the opposite ends of said arcuate bearing surface and said slot is so oriented that the web portion at one end of said arcuate bearing surface will abut said anchor pin in response to a force tending to move said brake shoe away from said anchor pin.]

8. A rigid brake shoe *for a brake assembly of the type including a brake drum and a pair of brake shoes having adjacent ends pivotally mounted to a support and actuating means disposed between the other ends of the brake shoes, said brake shoes* having a dual continuous web structure including an open recess formed at one end of each web, each said recess being laterally aligned with the other recess and comprised of an inner arcuate bearing surface having opposite ends and a mouth portion formed by integral shoe portions at the opposite ends of said arcuate bearing surface, said mouth portions being of a width to *radially,* slidably engage said arcuate bearing surfaces with a fixed *anchor* pin, [and] said arcuate bearing surfaces being so oriented as to *extend on both sides of a plane passing through the axis of curvature of said bearing surfaces and parallel to a major axis of said brake assembly which passes through the center of said actuating means, said bearing surfaces intersecting said plane on the side of said anchor pin remote from said actuating means and said portion of said bearing surface which lies on the side of said plane opposite to the major part of said webs extending between about 5° and 30° therebeyond to* bear against a complementary arcuate surface of said pin *and enable the brake shoe to pivot therearound* in response to an outwardly directed *actuating* force applied at the other end of said brake shoe with [said pin abutting against] a portion of said [recesses disposed relative to ] *arcuate bearing surfaces being maintained against* said pin to prevent substantial movement of said brake shoe in response to a *drum derived* force *existing when the shoe engages the drum* tending to move said brake shoe away from said pin.

9. In a brake assembly for a vehicle wheel, a support, a pair of rigid brake shoes *pivoted on said support,* a rotary cam actuator disposed between adjacent ends of said brake shoes, an open ended recess formed in the web at the end of each of said brake shoes opposite from said adjacent ends, each said recess being adapted to be radially, slidably mounted to a pin carried by said support, each said recess having an inner arcuate bearing surface disposed to engage a surface portion of said pin on both sides of a plane passing through the center of said pin and parallel to a major axis of said brake assembly which axis passes through the center of said rotary cam with the lower portion of the arcuate bearing surface extending at least 5° *and not more than 30°* on the remote side of said pin [and ], *with the remainder of said arcuate bearing surface extending on the other side of the pin, whereby each said recess is* adapted to abut said pin and prevent [further] movement *other than pivotal movement* of said brake shoe *relative to said pin* in response to a *drum derived* force tending to move said brake shoe away from said pin *when the shoe engages the drum.*

[10. The brake assembly defined by claim 9 wherein each of said recesses is a slot comprised of an inner arcuate bearing surface and a mouth portion formed by integral brake shoe portions at the opposite ends of said arcuate bearing surfaces and said slot is so oriented that said arcuate bearing surfaces are disposed to engage said pin on both sides of said plane.]

[11. In a brake assembly for a vehicle wheel, a support, a pair of rigid brake shoes, a rotatable cam disposed between adjacent ends of said brake shoes, an open ended recess formed in the end of the web of each brake shoe opposite from said adjacent ends, each said recess being adapted to be radially, slidably mounted to a pin carried by said support, each of said recess having an inner arcuate bearing surface disposed to engage a surface portion of said pin and a brake shoe portion extending tangentially outward from at least one end of said arcuate bearing surface, said brake shoe portion extending substantially beyond a radial plane passing through the center of said pin and the axis of rotation of said wheel on the side of said plane remote from a major portion of said arcuate bearing surface.]

12. An anchor pin for a vehicle brake assembly comprising an elongate pin having axially spaced cylindrical bearing areas adapted to radially, slidably receive [an] *respective aligned* open ended [recess] *recesses formed in the webs* of a dual web brake shoe, *said bearing areas being spaced by a cylindrical mounting surface of greater diameter than said bearing areas,* and a pair of oppositely facing *radially extending* surfaces integrally formed with said anchor pin [and extending radially outward at axially spaced locations on said pin] *at each end of said mounting surface, said radially extending surfaces being adapted to engage said webs adjacent said recesses* to prevent substantial axial movement of said anchor pin in either direction relative to said dual web brake shoe.

[13. The anchor pin defined by claim 12 wherein said axially spaced cylindrical bearing areas are provided by a cylindrical bearing surface at each end of said anchor pin and each of said cylindrical bearing surfaces is bounded at its axially inner end by a radially extending surface of said anchor pin.]

[14. The anchor pin defined by claim 12 wherein said axially spaced cylindrical bearing areas are provided by a cylindrical bearing surface intermediate the ends of said anchor pin and said cylindrical bearing surface is bounded at each of its axially outer ends by a radially extending surface of said anchor pin.]

[15. An anchor pin for a rotary cam actuated brake assembly comprising an elongate pin having a stepped cylindrical surface including a cylindrical brake shoe bearing surface of one diameter at each end thereof and a cylindrical mounting surface of greater diameter extending a substantial axial distance between said cylindrical bearing surfaces.]

16. An anchor pin for a rotary cam actuated brake assembly comprising an elongate pin having a stepped cylindrical surface including a cylindrical mounting surface of one diameter integrally formed at each end thereof and a cylindrical brake shoe bearing surface of smaller diameter extending a substantial axial distance between said cylindrical mounting surfaces.

17. In a rotary cam actuated brake assembly for a vehicle wheel comprising a support having [an] *a cylindrical* opening therethrough and a pair of brake shoes with each brake shoe having a pair of axially spaced webs, the combination of an elongate member having a first *cylindrical* portion adapted to be axially inserted in said support opening *for free rotation therein* and a second portion providing axially spaced cylindrical bearing areas, and an open ended recess in each web at one end of each of said brake shoes, the recesses at each of said brake shoe ends being laterally aligned with each other and the width of said recesses being large enough to radially, slidably engage said cylindrical bearing areas but less than the corresponding width of said first portion of said member to prevent said first portion of said member from moving a substantial axial distance between said webs when both of said recesses are engaged with said cylindrical bearing areas.

18. The rotary cam actuated brake assembly defined by claim 17 wherein said opening is a bore through said support and said first portion of said elongate member is a cylindrical mounting surface intermediate said cylindrical bearing areas and of greater diameter than said cylindrical bearing areas.

19. The rotary cam actuated brake assembly defined by claim 17 wherein said opening is a bore provided through axially spaced bosses on said support, said first portion of said elongate member is comprised of a pair of axially spaced cylindrical mounting surfaces seated in said bosses and said second portion of said elongate member is a cylindrical brake shoe bearing surface of a diameter less than the diameter of said axially spaced cylindrical mounting surfaces and extends between said axially spaced cylindrical mounting surfaces.

20. In a brake assembly for a vehicle wheel comprising a support, a pair of brake shoes with each brake shoe having a pair of axially spaced webs, a rotary cam actuator disposed between adjacent ends of said brake shoes, the opposite ends of said brake shoes being mounted for pivotal movement about an anchor pin carried in a cylindrical bore provided through said support and means biasing the adjacent ends of said brake shoes toward said rotary cam, the improvement comprising:

an anchor pin having a cylindrical center portion seated in said bore and a cylindrical brake shoe bearing surface at each end of said center portion, each of said cylindrical brake shoe bearing surfaces being of smaller diameter than the diameter of said center portion of said anchor pin, and an open ended recess in each web at said opposite ends of said brake shoes, the width of said recesses being adapted to radially, slidably engage said cylindrical brake shoe bearing surfaces of said anchor pin but less than the diameter of said center portion of said anchor pin, said webs being spaced to seat said recesses adjacent the axially spaced ends of said cylindrical center portion of said anchor pin to prevent [the center portion of] said anchor pin from being axially displaced from said bore.

21. The brake assembly defined in claim 20 wherein each of said open ended recesses is comprised of an inner arcuate bearing surface and a portion of said web extending tangentially at one end of said arcuate bearing surface and said recesses are so oriented as to pivot about said cylindrical brake shoe bearing surfaces of said anchor pin in response to an outwardly directed force applied at the other end of said brake shoe and to abut said cylindrical brake shoe bearing surfaces and prevent further movement of said brake shoe in response to a force tending to move said brake shoe away from said anchor pin.

22. In a brake assembly for a vehicle wheel comprising a support, a pair of brake shoes with each brake shoe having a pair of axially spaced webs, a rotary cam actuator disposed between adjacent ends of said brake shoes, the opposite ends of said brake shoes being mounted for pivotal movement about an anchor pin carried in a pair of axially aligned bores provided through axially spaced portions of said support and means biasing the adjacent ends of said brake shoes toward said rotary cam, the improvement comprising:

an anchor pin having a cylindrical mounting surface at each end thereof and a cylindrical brake shoe bearing surface intermediate said mounting surfaces, each of said cylindrical mounting surfaces being of a diameter larger than the diameter of said cylindrical brake shoe bearing surface and carried in one of said axially aligned bores, and an open ended recess in each web at said opposite ends of said brake shoes, the width of said recesses being adapted to radially, slidably engage said cylindrical brake shoe bearing surface of said anchor pin but less than the diameter of said cylindrical mounting surfaces of said anchor pin, said webs being spaced to seat said recesses adjacent said mounting surfaces to prevent said mounting surfaces from being displaced from said axially aligned bores.

23. The brake assembly defined in claim 22 wherein each of said open ended recesses is comprised of an inner arcuate bearing surface and a portion of said web extending tangentially at one end of said arcuate bearing surface and said recesses are so oriented as to pivot about said cylindrical brake shoe bearing surface of said anchor pin in response to an outwardly directed force applied to the other end of said brake shoe and to abut said cylindrical brake shoe bearing surface and prevent further movement of said brake shoe in response to a force tending to move said brake shoe away from said anchor pin.

*24. In a vehicle brake assembly wherein a wheel mounted drum surrounds a pair of brake shoes having longitudinally continuous rigid webs pivoted at one end on an anchor means having at least one cylindrical anchor pin surface and their other ends in operative association with a rotary cam actuator adapted to displace said shoes from a retracted position where return springs hold them away from frictional contact with the drum and a braking position in contact with the drum thereby developing a circumferential force which complements the force actuating one shoe and a circumferential force opposite to the force actuating the other shoe; the improvement which comprises means providing an open ended recess at said one end of each brake shoe of such width as to radially slidably fit upon said cylindrical anchor pin surface, said recess having an inner arcuate bearing surface portion abutting in full surface engagement with said cylindrical anchor pin surface in said brake retracted position and said recess being so oriented that a portion of said arcuate bearing surface of the recess extends to engage said anchor pin surface not more than 30° at one side of the intersection of that surface with a plane passing through the center of said anchor pin surface and parallel to a major axis of said brake assembly which passes through the axis of said rotary cam and the remainder of said arcuate surface of the recess engages said anchor pin surface at the other side of said plane whereby when said brake shoes are pivotally displaced from retracted position into braking engagement with the rotating drum said arcuate recess surface will maintain such effective abutment with said cylindrical anchor pin surface as to prevent movement of said brake shoes away from said anchor pin in response to a force derived from engagement of said brake shoes with the drum and tending to move said brake shoes relative to said anchor pin.*

*25. A brake shoe adapted for coaction with a surrounding rotatable wheel mounted drum in a brake assembly, said shoe having a continuous rigid web, one end of which is adapted to be operatively connected to an actuator and the other end of which is formed with an open ended recess providing an arcuate surface adapted for bearing engagement with a cylindrical anchor pin surface and a straight edge extending from the end of said arcuate surface that is furthest from the end of the web connected to said actuator, said recess being of such width as to be slidably engaged with said anchor pin surface and said recess being so inclined that, in assembly, said edge extends at an angle between 60° and 85° relative to a plane parallel to a diameter of said wheel passing through the center of said actuator.*

*26. A brake shoe adapted for coaction with a surrounding rotatable wheel mounted drum, said shoe having a continuous rigid web, one end of which is adapted to be operatively connected to an actuator and the other end of which is formed with an open ended recess providing an arcuate surface adapted for bearing engagement with a cylindrical anchor pin surface and parallel straight edges extending from the ends of said arcuate surface, said recess being of such width as to be slidably engaged with said anchor pin and said recess being so inclined that, in assembly, said edges extend at an angle between 60° and 85° relative to a plane parallel to a diameter of said wheel passing through the center of said actuator, whereby, upon actuation of said brake, said arcuate surface is maintained in engagement with said anchor pin surface.*

*27. A brake shoe adapted for coaction with a surrounding rotatable wheel mounted drum, said shoe having a continuous rigid web, one end of which is adapted to be operatively connected to a rotary cam actuator and the other end of which is formed with an open ended recess providing an arcuate surface adapted for bearing engagement with a cylindrical anchor pin surface and parallel straight edges extending from the ends of said arcuate surface, said recess being of such width as to be slidably engaged with said anchor pin surface and said recess being so inclined that, in assembly, said edges extend at an angle between 60° and 85° relative to a plane parallel to a diameter of said wheel passing through the axis of said rotary cam actuator, whereby, upon actuation of said brake, said arcuate surface is maintained in engagement with said anchor pin surface.*

*28. An anchor pin for a vehicle brake assembly comprising an elongate pin having axially spaced cylindrical bearing areas adapted to radially slidably receive respective open-ended recesses formed in the webs of a dual web brake shoe, said bearing areas being provided by a cylindrical bearing surface intermediate the ends of said anchor pin and a pair of oppositely facing radial surfaces integrally formed with said anchor pin at the opposite ends of said cylindrical bearing surface, said surfaces being adapted to engage said webs adjacent said recesses to prevent substantial axial movement of said anchor pin in either direction relative to said dual brake shoe.*

* * * * *